United States Patent
Ohnemus (10) Patent No.: US 11,827,103 B2
(45) Date of Patent: Nov. 28, 2023

(54) TRANSMISSION ASSEMBLY AND DRIVE UNIT

(71) Applicant: Bayerische Motoren Werke Aktiengesellschaft, Munich (DE)

(72) Inventor: Ulrich Ohnemus, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/798,328

(22) PCT Filed: Feb. 3, 2021

(86) PCT No.: PCT/EP2021/052494
§ 371 (c)(1),
(2) Date: Aug. 9, 2022

(87) PCT Pub. No.: WO2021/170357
PCT Pub. Date: Sep. 2, 2021

(65) Prior Publication Data
US 2023/0114171 A1    Apr. 13, 2023

(30) Foreign Application Priority Data

Feb. 24, 2020   (DE) ..................... 10 2020 104 791.6

(51) Int. Cl.
*B60K 6/365* (2007.10)
*B60K 6/547* (2007.10)
(Continued)

(52) U.S. Cl.
CPC .............. *B60K 6/547* (2013.01); *B60K 6/365* (2013.01); *B60K 6/445* (2013.01); *B60K 6/52* (2013.01); *B60K 6/40* (2013.01)

(58) Field of Classification Search
CPC .......... B60K 6/547; B60K 6/445; B60K 6/40; B60K 6/365; B60K 17/342; F16H 2001/289; F16H 1/46; F16H 2037/047
See application file for complete search history.

(56) References Cited

U.S. PATENT DOCUMENTS 5,149,307 A     9/1992  Malloy et al.
10,436,287 B2 * 10/2019 Beck .................... F16H 3/66
(Continued)

FOREIGN PATENT DOCUMENTS

DE          31 43 301 A1     5/1983
DE    10 2005 039 928 A1    3/2007
(Continued)

OTHER PUBLICATIONS

International Search Report (PCT/ISA/210) issued in PCT Application No. PCT/EP2021/052494 dated Mar. 26, 2021 with English translation (seven (7) pages).
(Continued)

*Primary Examiner* — Tisha D Lewis
(74) *Attorney, Agent, or Firm* — Crowell & Moring LLP (57) ABSTRACT

A transmission assembly may include a first transmission input shaft and a second transmission input shaft. The first transmission input shaft and the second transmission input shaft are torque-transmittingly coupled to a first planetary transmission. A transmission output shaft of the transmission assembly is also torque-transmittingly coupled to a second planetary transmission. In the power flow, a first spur gear is arranged between the first planetary transmission and the second planetary transmission. In addition, a drive unit for driving a first vehicle axle is proposed, which has a transmission assembly of this type.

13 Claims, 4 Drawing Sheets

(51) Int. Cl.
*B60K 6/445* (2007.10)
*B60K 6/52* (2007.10)
*B60K 6/40* (2007.10)

(56) References Cited

U.S. PATENT DOCUMENTS

| | | | |
|---|---|---|---|
| 2005/0032598 A1* | 2/2005 | Hanyu | B60W 30/18027 475/5 |
| 2014/0100072 A1 | 4/2014 | Kaltenbach et al. | |
| 2019/0344654 A1 | 11/2019 | Kaltenbach et al. | |
| 2021/0188077 A1* | 6/2021 | Rechenbach | F16H 47/04 |

FOREIGN PATENT DOCUMENTS

| | | |
|---|---|---|
| DE | 10 2012 218 367 A1 | 4/2014 |
| DE | 10 2017 201 607 A1 | 8/2018 |
| DE | 10 2018 203 207 A1 | 9/2019 |
| EP | 773127 A2 * 5/1997 | ............... B60K 6/04 |
| JP | 2004-182034 A | 7/2004 |
| WO | WO 2010/061401 A2 | 6/2010 |
| WO | WO 2017/095296 A1 | 6/2017 |

OTHER PUBLICATIONS

German-language Written Opinion (PCT/ISA/237) issued in PCT Application No. PCT/EP2021/052494 dated Mar. 26, 2021 (eight (8) pages).
German-language Search Report issued in German Application No. 10 2020 104 791.6 dated Oct. 6, 2020 with partial English translation (15 pages).

* cited by examiner

TRANSMISSION ASSEMBLY AND DRIVE UNIT

BACKGROUND AND SUMMARY

The invention relates to a transmission assembly, in particular for a hybrid vehicle, having a first transmission input shaft of the transmission assembly, said first transmission input shaft being couplable to an internal combustion engine, and a second transmission input shaft of the transmission assembly, said second transmission input shaft being couplable to a first electric drive machine. A transmission output shaft of the transmission assembly is also provided.

The invention also relates to a drive unit for driving a first vehicle axle, wherein the drive unit comprises such a transmission assembly. Provision is also made of an internal combustion engine which is coupled to the first transmission input shaft in a torque-transmitting manner, and a first electric drive machine which is coupled to the second transmission input shaft in a torque-transmitting manner.

Such transmission assemblies and drive units equipped with same are known from the prior art.

If the transmission assembly is specifically configured for use in a hybrid drivetrain or in a hybrid drive unit, reference is also made to DHT or DH transmissions (dedicated hybrid transmission, abbreviation: DHT). Hybrid drivetrains or hybrid drive units are drivetrains or drive units which utilize two drive motors that are independent of one another, e.g. an internal combustion engine and an electric drive machine. Transmission assemblies of this kind have to be of particularly compact construction in order to provide additional space for the electric drive machine compared with conventional transmission assemblies.

An object of the invention is thus to provide a transmission assembly of the type mentioned in the introduction which has a particularly compact construction. At the same time, the intention is to be able to use the transmission assembly to implement a certain number of shift stages or gears, such that a drive unit equipped with the transmission assembly can be operated in an efficient and convenient manner.

The object is achieved by means of a transmission assembly of the type mentioned in the introduction, which has a first planetary transmission, a second planetary transmission and a first spur gear transmission. In this case, the first transmission input shaft and the second transmission input shaft are coupled to the first planetary transmission in a torque-transmitting manner. The transmission output shaft is also coupled to the second planetary transmission in a torque-transmitting manner. Furthermore, the first spur gear transmission is arranged in the power flow between the first planetary transmission and the second planetary transmission. The planetary transmissions may be utilized as summing transmissions. Alternatively, they may be embodied as stationary transmissions or be used in the blocked state. The spur gear transmission lying between them has a relatively simple construction and can be embodied in a known manner as a shiftable transmission. This can be designed to be shiftable more easily than a planetary transmission. Overall, the transmission assembly thus has a simple and cost-effective construction. At the same time, it takes up only a relatively small structural space.

The invention is based on the idea of providing a transmission assembly in which planetary transmissions are utilized as summing transmissions and a plurality of shift stages are provided by way of a spur gear transmission which is coupled in terms of drive to the planetary transmissions. Every transmission is thus used for exactly the task to which it is particularly well suited. Planetary transmissions are very well suited as summing transmissions. It is relatively complicated to provide various shift stages by means of planetary transmissions. The exact opposite is the case for spur gear transmissions. Spur gear transmissions can be used to provide shift stages in a simple manner. However, spur gear transmissions are less well suited as summing transmissions. The advantages of planetary transmissions and spur gear transmissions are thus combined.

According to one embodiment, the first transmission input shaft is coupled to a ring gear or to a planet carrier of the first planetary transmission in a torque-transmitting manner. In particular, the first transmission input shaft is connected to the ring gear or to the planet carrier of the first planetary transmission in a rotationally fixed manner. The first transmission input shaft is thus coupled to the first planetary transmission in a structurally simple manner. A coupling of this kind also takes up only a small amount of structural space.

The second transmission input shaft may be coupled to a sun gear of the first planetary transmission in a torque-transmitting manner. In particular, the second transmission input shaft is connected to the sun gear of the first planetary transmission in a rotationally fixed manner. The second transmission input shaft is thus also coupled to the first planetary transmission in a structurally simple manner. Such a coupling is also compact.

In a variant, the second transmission input shaft is selectively couplable to a ring gear of the first planetary transmission in a rotationally fixed manner by means of a first shift element. Alternatively or in addition, the second transmission input shaft is selectively couplable to a transmission housing in a rotationally fixed manner by means of a second shift element. It is thus possible for the second transmission input shaft to be simultaneously coupled to the sun gear and the ring gear of the first planetary transmission. The first planetary transmission is then in a blocked state. If the second transmission input shaft is coupled to the transmission housing in a rotationally fixed manner, it serves merely to support a torque introduced into the first planetary transmission via the first transmission input shaft. Torques which are introduced into the transmission assembly via the first transmission input shaft and/or the second transmission input shaft can thus be summed in a flexible manner by means of the first planetary transmission In this context, the first shift element and the second shift element may be embodied as what is known as a double shift element. There is then only a single shift element overall which, when actuated in a first shifting direction, couples the transmission input shaft to the ring gear of the first planetary transmission in a rotationally fixed manner and, when actuated in a second shifting direction opposite to the first shifting direction, couples the second transmission input shaft to the transmission housing in a rotationally fixed manner.

The first planetary transmission may also be connected to the first spur gear transmission in a torque-transmitting manner via a wraparound transmission in order to introduce torque into the first spur gear transmission. The first planetary transmission and the first spur gear transmission are thus efficiently connected in a torque-transmitting manner. In this case, the wraparound transmission gives rise to a certain degree of spatial flexibility in the arrangement of the first spur gear transmission relative to the first planetary transmission. It is consequently possible for the transmission assembly to be adapted to available structural spaces within a vehicle in a flexible manner. A wraparound transmission also gives rise to at least a certain degree of decoupling of the first planetary transmission from the first spur gear transmission with regard to axially acting drive influences.

The wraparound transmission is preferably embodied as a chain drive. In a particularly preferred embodiment, use is made of a toothed chain drive which is provided merely with two slide rails, that is to say manages without tension elements. Such wraparound transmissions have a long service life and operate with relatively little friction.

A wraparound transmission may alternatively also be referred to as a traction mechanism drive or flexible drive mechanism. In this respect, the terms wraparound transmission, traction mechanism drive and flexible drive mechanism are synonyms. It thus goes without saying that each wraparound transmission may also be replaced by an identically acting gearwheel transmission. This comprises, for example, three spur gearwheels, such that the directions of rotation at the drive and at the output drive are maintained in comparison with the wraparound transmission. In addition, a gearwheel transmission which utilizes a plurality of relatively small gearwheels is advantageous with regard to the required structural space.

It is also possible for a planet carrier or a ring gear of the first planetary transmission to be coupled to an input shaft of the first spur gear transmission in a torque-transmitting manner via the wraparound transmission. Torque can consequently be introduced into the spur gear transmission in a simple and reliable manner.

The first spur gear transmission preferably has at least two shiftable spur gear stages. In this way, the transmission assembly is shiftable overall. Two shiftable spur gear stages consequently make it possible to implement two gears which each have different transmission ratios. Preferred transmission assemblies have four, five or six gears which each have different transmission ratios.

In the structurally simplest case, the number of gears corresponds to the number of shiftable spur gear stages. It is thus necessary for a shift element to be provided for each shiftable spur gear stage. Alternatively, pairs of shiftable spur gear stages may also be actuated by means of a common shift element embodied as a double shift element. It is consequently possible to operate the transmission assembly in an efficient and convenient manner.

In this context, the first spur gear transmission may have exclusively form-fitting shift elements.

According to an alternative, an output shaft of the first spur gear transmission is coupled to a sun gear of the second planetary transmission in a torque-transmitting manner. In particular, the output shaft of the first spur gear transmission is coupled to the sun gear of the second planetary transmission in a rotationally fixed manner. Torque can thus be introduced into the second planetary transmission in an efficient and reliable manner. This coupling also gives rise to a compact construction.

The second planetary transmission may be embodied as a stationary transmission. There are a plurality of variants for this which may be selected depending on the required direction of rotation. In a first variant, the sun gear constitutes the drive of the second planetary transmission and the planet carrier is fixed to the housing. The ring gear then acts as output drive. In a second variant, the sun gear likewise serves as drive; however the ring gear is now fixed to the housing. The planet carrier then serves as output drive. In each of the variants mentioned, the transmission ratios can be adapted in accordance with the requirements of the application.

One variant provides that an input shaft of the first spur gear transmission and an output shaft of the first spur gear transmission run substantially parallel. The spur gear transmission then preferably comprises a plurality of spur gear stages which each comprise a gearwheel which is arranged on the input shaft, and a gearwheel which meshes therewith and which is arranged on the output shaft. Preferably, in each case one gearwheel of a spur gear stage is embodied as a fixed gearwheel and the respectively other gearwheel is embodied as an idler gearwheel. The input shaft and the output shaft may thus be coupled in a torque-transmitting manner via one of the shiftable spur gear stages. Such a construction is particularly simple and cost-saving.

Alternatively, an input shaft of the first spur gear transmission and an output shaft of the first spur gear transmission may be arranged in a substantially concentric manner. The first spur gear transmission then comprises a countershaft via which the input shaft and the output shaft are selectively couplable in a torque-transmitting manner. The torque flow within the spur gear transmission thus passes from the input shaft to the countershaft and from there to the output shaft. In this case, the input shaft and the countershaft may be couplable via a plurality of shiftable spur gear stages. The same applies to the countershaft and the output shaft, which may likewise be couplable via one or more shiftable spur gear stages. On the spur gear transmission, it is thus possible to set various transmission ratio stages, for example by shifting a spur gear stage which couples the input shaft to the countershaft and shifting a further spur gear stage which couples the countershaft to the output shaft. Such a spur gear transmission is of relatively compact construction in particular in an axial direction. This is applicable in particular with reference to the number of transmission ratio stages that can be implemented by means of such a transmission. In comparison with the aforementioned variant of the spur gear transmission, the spur gear transmission according to the present variant is of compact construction. In particular, the number of spur gear set planes in the axial direction has been reduced. The number of shaft planes has been maintained, but with each power path now being realized by means of two shift elements. The number of tooth meshing engagement points in this case corresponds to the standard customary for vehicles in the case of known manual transmissions.

In both variants, the spur gear transmission is preferably arranged so as to be axially parallel with respect to the crankshaft of the internal combustion engine. Due to this arrangement, structural space for one or more electric drive machines is obtained along the crankshaft, next to the internal combustion engine.

In one embodiment, a third transmission input shaft is provided which is couplable to a second electric drive machine. In this case, the third transmission input shaft is coupled to the second planetary transmission in a torque-transmitting manner in order to introduce torque into the second planetary transmission. The transmission assembly may thus also be used in a drive system that comprises two electric drive machines and an internal combustion engine. In this case, the second electric drive machine acts on the transmission output shaft of the transmission assembly merely by way of the second planetary transmission. The second electric drive machine is thus provided close to the output drive.

In one variant, a planet carrier of the second planetary transmission is fixed to the housing. The second planetary transmission is thus utilized as a stationary transmission. This results in a simple construction of the transmission assembly overall.

According to a preferred embodiment, the first spur gear transmission and the third transmission input shaft are coupled to the same element of the second planetary transmission in a torque-transmitting manner. In particular, both the spur gear transmission and the third transmission input shaft are coupled to a sun gear of the second planetary transmission in a torque-transmitting manner.

Advantageously, the third transmission input shaft is coupled to the second planetary transmission in a torque-transmitting manner via a wraparound transmission in order to introduce torque into the second planetary transmission. In particular, the third transmission input shaft is additionally coupled to the second planetary transmission in a torque-transmitting manner via a second spur gear transmission. By means of the wraparound transmission, the position of the second planetary transmission relative to the third transmission input shaft is provided with a certain degree of flexibility. If a second spur gear transmission is provided, the torque imparted by the third transmission input shaft and the rotational speed imparted by the third transmission input shaft may be adapted to the requirements at the second planetary transmission by way of the associated transmission ratios. The second spur gear transmission may also be shiftable.

In one variant, an output shaft of the first spur gear transmission can be fixed to the transmission housing by means of a further shift element. As a result, the transmission output shaft is also prevented from performing a rotational movement. It is thus possible to implement a parking lock function in a simple manner.

The further shift element is preferably embodied as a shiftable freewheel. In this context, in addition to the parking lock function, the further shift element may also be used to provide a hill-hold function which makes it possible to perform a hill start without rolling back.

The object is also achieved by means of a drive unit of the type mentioned in the introduction which comprises a transmission assembly according to the invention. In this case, the internal combustion engine is coupled to the first transmission input shaft in particular by way of a torsional vibration damper and a separating clutch, without a launch function. The separating clutch is in particular a frictionally engaging clutch. The first electric drive machine has two functions. On the one hand, it is used to support a torque introduced by the internal combustion engine into the transmission assembly. This is necessary in particular if the first planetary transmission is neither in a blocked state nor supported on the transmission housing. In addition, the first electric drive machine can be used to set a transmission ratio between the first transmission input shaft and an output shaft of the first planetary transmission in a variable manner. This may take place in a continuously variable manner. The first planetary transmission and the first electric drive machine thus constitute what is known as an electric continuously variable transmission (often referred to as e-CVT for short). In this context, it is in particular possible for the transmission ratio to be adjusted such that it is not necessary to provide the internal combustion engine with a launch element, for example in the form of a launch clutch. It is nevertheless possible, for example for safety reasons, to provide a separating clutch by means of which the internal combustion engine can be separated in terms of drive from the first planetary transmission. In particular, such a separating clutch is arranged between a torsional vibration damper assigned to the internal combustion engine and the first planetary transmission. In all applications, the first electric drive machine may function as a generator or as a motor.

In this case, the transmission output shaft may be arranged coaxially with respect to the first vehicle axle or at least in the region of the first vehicle axle and parallel to the first vehicle axle. In particular, an output shaft of the first spur gear transmission is also arranged coaxially with respect to the first vehicle axle or at least in the region of the first vehicle axle and parallel to the first vehicle axle. In this case, the vehicle axle is an axle with driven wheels. In this context, a region of the first vehicle axle is defined by a pivotability of the wheel-side end shafts. The region of the first vehicle axle is thus defined by the space in which the wheel-side end shafts can be pivoted proceeding from the respectively assigned wheel central point. The drive unit is consequently arranged between the wheels. As a result, the transmission assembly takes up a structural space that is generally not otherwise required. Structural space conflicts with other elements of a motor vehicle are thus avoided.

A second electric drive machine for driving the first vehicle axle may also be coupled to a third transmission input shaft in a torque-transmitting manner. Alternatively, a second electric drive machine is coupled in terms of drive to a second vehicle axle. In this context, during operation of the drive unit, the second electric drive machine can be used to provide what is known as a boost function. In this case, an additional torque is briefly applied to the transmission output shaft by the second electric drive machine. This is applicable to both variants. A second electric drive machine which is coupled to the third transmission input shaft may also be operated as a generator. It can then recuperate power which is introduced by way of the transmission output shaft into the transmission assembly. This is also possible in both variants If the internal combustion engine is not being operated, drive may also be effected merely using the first and/or the second electric drive machine. The drive is thus purely electric. It is also possible to effect purely electric reverse travel using both electric drive machines. It is then not necessary to provide a reverse gear in the spur gear transmission.

The first electric drive machine may also be utilized for charging a vehicle battery at a standstill if it is not coupled in terms of drive to the vehicle axle. The first electric drive machine then functions as a generator and is driven by the internal combustion engine.

BRIEF DESCRIPTION OF THE DRAWINGS

Certain embodiments will be explained below on the basis of various exemplary embodiments which are shown in the attached drawings, in which.

DETAILED DESCRIPTION OF THE DRAWINGS

Figure 1:
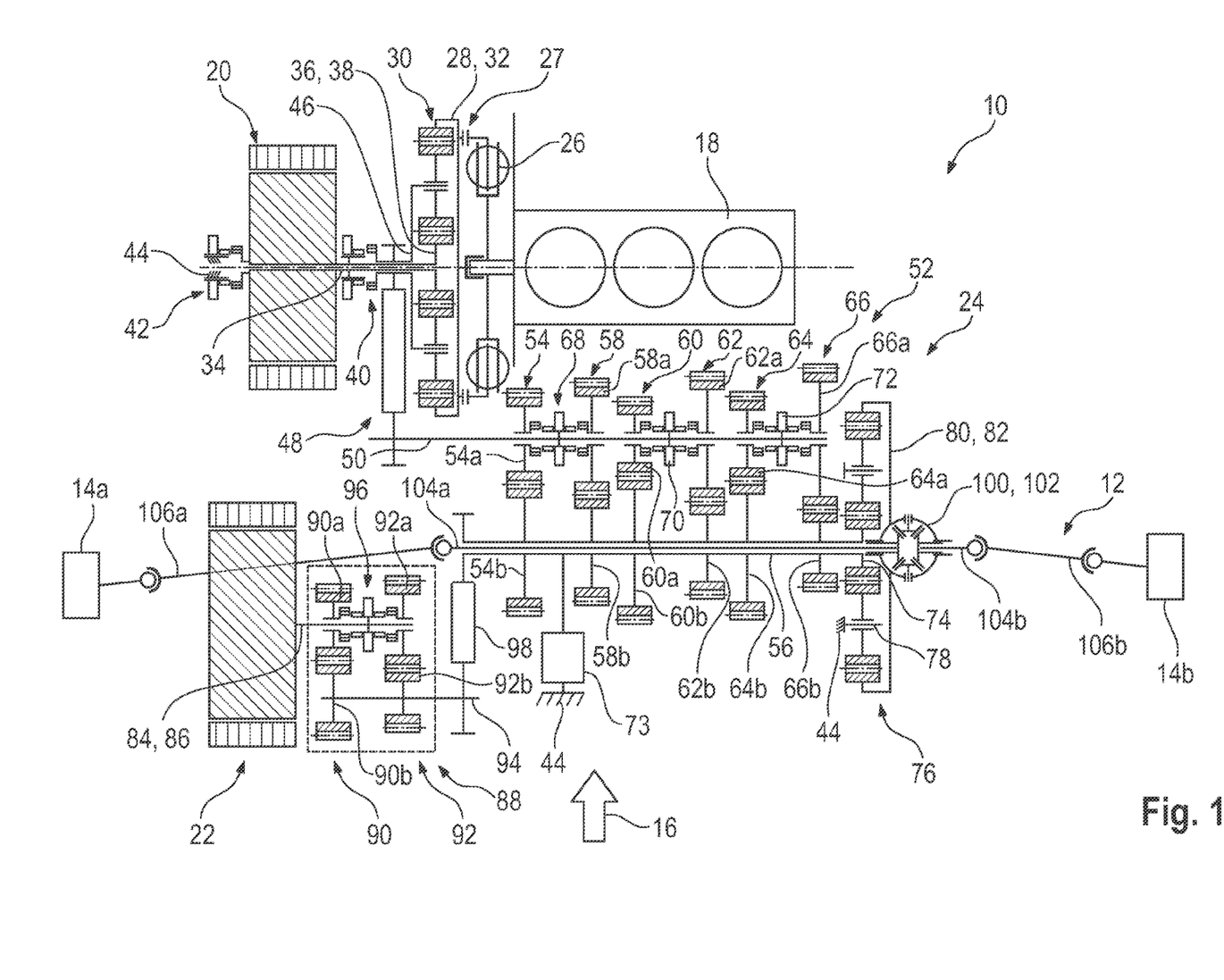
FIG. 1 shows a drive unit according to the invention with a transmission assembly according to the invention according to a first embodiment.

FIG. 1 shows a drive unit 10 for driving a first vehicle axle 12 of a hybrid vehicle.

In this case, the first vehicle axle 12 is a front axle with a left front wheel 14a and a right front wheel 14b. A direction of travel is indicated with an arrow 16.

The drive unit 10 comprises an internal combustion engine 18, which is a transversely mounted three-cylinder engine in the exemplary embodiment illustrated.

In addition, the drive unit 10 has a first electric drive machine 20 and a second electric drive machine 22.

Provision is also made of a transmission assembly 24, which couples the internal combustion engine 18, the first electric drive machine 20 and the second electric drive machine 22 in terms of drive to the wheels 14a, 14b of the first vehicle axle 12.

For this purpose, the internal combustion engine 18 is coupled to a ring gear 28 of a first planetary transmission 30 of the transmission assembly 24 in a torque-transmitting manner by way of a torsional vibration damper 26 and a separating clutch 27.

The ring gear 28 thus constitutes a first transmission input shaft 32 of the transmission assembly 24.

The first electric drive machine 20 is also coupled to the first planetary transmission 30 in a torque-transmitting manner.

More precisely, an output drive shaft 34 of the electric drive machine 20 is fixedly connected to a sun gear 36 of the first planetary transmission 30.

It goes without saying that the first electric drive machine 20 does not necessarily have to be arranged coaxially with respect to the sun gear 36. If required by the structural space conditions, it may also be provided so as to be axially parallel with respect to the first planetary transmission 30. The first electric drive machine 20 is then coupled to the first planetary transmission 30 via a gearwheel stage or a wraparound transmission.

The sun gear 36 thus functions as a second transmission input shaft 38 of the transmission assembly 24.

The first planetary transmission 30 is also equipped with a first shift element 40, which selectively couples the second transmission input shaft 38, that is to say the sun gear 36, to a planet carrier 46.

In addition, provision is made of a second shift element 42 via which the second transmission input shaft 38, that is to say the sun gear 36, can be connected to a transmission housing 44 (illustrated merely schematically). The second transmission input shaft 38 can thus be fixed to the transmission housing 44 by the second shift element 42.

The planet carrier 46 of the first planetary transmission 30 also functions as an output shaft of the first planetary transmission 30.

The planet carrier 46 is coupled to an input shaft 50 of a first spur gear transmission 52 in a torque-transmitting manner via a wraparound transmission 48, which is embodied as a chain drive in the present case.

Viewed overall, the wraparound transmission 48 thus connects the first planetary transmission 30 to the first spur gear transmission 52 in a torque-transmitting manner.

The first spur gear transmission 52 comprises a total of six shiftable spur gear stages.

In this case, a first shiftable spur gear stage 54 comprises an idler gearwheel 54a which is rotatably arranged on the input shaft 50, and a fixed gearwheel 54b which is fixedly seated on an output shaft 56 of the first spur gear transmission 52.

A second shiftable spur gear stage 58 also comprises an idler gearwheel 58a and a fixed gearwheel 58b, again with the idler gearwheel 58a being rotatably arranged on the input shaft 50 and the fixed gearwheel 58b being fixedly seated on the output shaft 56.

A third shiftable spur gear stage 60 is equipped with an idler gearwheel 60a which is rotatably arranged on the input shaft 50, and with a fixed gearwheel 60b which is fastened to the output shaft 56.

A fourth shiftable spur gear stage 62 likewise has an idler gearwheel 62a which is rotatably arranged on the input shaft 50. In addition, the fourth spur gear stage 62 is equipped with a fixed gearwheel 62b which is fixedly seated on the output shaft 56.

A fifth spur gear stage 64 also comprises an idler gearwheel 64a and a fixed gearwheel 64b. The idler gearwheel 64a is rotatably arranged on the input shaft 50, and the fixed gearwheel 64b is fixedly seated on the output shaft 56.

A sixth spur gear stage 66 is equipped with an idler gearwheel 66a which is rotatably arranged on the input shaft 50, and with a fixed gearwheel 66b which is fixedly seated on the output shaft 56.

Idler gearwheels and fixed gearwheels that belong to the same spur gear stage are in engagement with one another in this case.

The input shaft 50 and the output shaft 56 run substantially parallel.

A total of three double shift elements 68, 70, 72 are provided for the selective connection of the idler gearwheels 54a, 58a, 60a, 62a, 64a, 66a to the input shaft 50.

In this case, the shift element 68 can be used to couple either the idler gearwheel 54a or the idler gearwheel 58a to the input shaft 50 in a rotationally fixed manner.

The shift element 70 can be used to selectively couple the idler gearwheel 60a or the idler gearwheel 62a to the input shaft 50 in a rotationally fixed manner.

The shift element 72 is used to couple either the idler gearwheel 64a or the idler gearwheel 66a to the input shaft 50 in a rotationally fixed manner.

It goes without saying that each of the double shift elements 68, 70, 72 can also be replaced by two respectively single-acting shift elements with unchanged function of the first spur gear transmission 52.

Provision is also made of a shift element 73 via which the output shaft 56 of the first spur gear transmission 52 can be selectively fixed to the transmission housing 44. The transmission output shaft 82 is then also no longer able to rotate. The shift element 73 thus functions as a parking lock.

In an alternative embodiment that is not illustrated, the shift element 73 is embodied as a shiftable freewheel, in particular as a shiftable freewheel brake. The shift element 73 can then provide both a parking lock function and a hill-hold function.

All shift elements of the drive unit 10 function in a positively engaging manner.

The output shaft 56 is also fixedly connected to a sun gear 74 of a second planetary transmission 76.

The first spur gear transmission 52 is thus arranged in the power flow between the first planetary transmission 30 and the second planetary transmission 76.

In the case of the second planetary transmission 76, a planet carrier 78 is connected to the transmission housing 44 (again illustrated only schematically) in a rotationally fixed manner. The planet carrier 78 is thus fixed in space.

Accordingly, a ring gear 80 of the second planetary transmission 76 functions as an output shaft of the second planetary transmission 76 and thus as a transmission output shaft 82 of the transmission assembly 24 as a whole.

The output shaft 56 of the first spur gear transmission 52, said output shaft being fixedly connected to the sun gear 74 of the second planetary transmission 76, also cooperates with the second electric drive machine 22.

To this end, the second electric drive machine 22 initially acts on a third transmission input shaft 86 which is fixedly connected to an output drive shaft of the second electric drive machine 22.

In this case, the third transmission input shaft 86 is simultaneously an input shaft 84 of a second spur gear transmission 88.

This comprises a first spur gear stage 90 and a second spur gear stage 92, via which the input shaft 84 can be selectively coupled to an output shaft 94 of the second spur gear transmission 88 in a torque-transmitting manner.

To this end, the first spur gear stage 90 has an idler gearwheel 90a which is rotatably arranged on the input shaft 84 and which meshes with a fixed gearwheel 90b which is fixedly positioned on the output shaft 94.

The second spur gear stage similarly comprises an idler gearwheel 92a which meshes with a fixed gearwheel 92b.

The idler gearwheels 90a, 92a can be selectively connected to the input shaft 84 in a rotationally fixed manner with a shift element 96. The shift element 96 is thus a double shift element.

It goes without saying that the shift element 96 can also be replaced by two respectively single-acting shift elements with unchanged function.

The output shaft 94 is also coupled to the output shaft 56 of the first spur gear transmission 52 in a torque-transmitting manner via a wraparound transmission 98.

Both the first electric drive machine 20 and the second electric drive machine 22 and the internal combustion engine 18 thus act on the transmission output shaft 82.

In the exemplary embodiment illustrated, said transmission output shaft is connected to a cage 100 of a differential transmission 102 in a rotationally fixed manner.

In this case, a left output drive shaft 104a and a right output drive shaft 104b proceed from the differential transmission 102.

The wheels 14a, 14b are each coupled to the respectively assigned output drive shaft 104a, 104b in a rotationally fixed manner by way of assigned end shafts 106a, 106b.

In this case, a region of the first vehicle axle 12 is defined by the output drive shafts 104a, 104b and the end shafts 106a, 106b, which are connected to the respectively assigned output drive shaft 104a, 104b in an articulated manner.

This region is thus substantially cylindrical, the output drive shafts 104a, 104b being arranged on a cylinder central axis and the end shafts 106a, 106b defining, in their maximally deflected state, an associated cylinder shell as region limit.

The transmission output shaft 82 lies within this region and is also arranged parallel to the first vehicle axle 12.

The output shaft 56 of the first spur gear transmission 52 also lies in this region.

Figure 2:
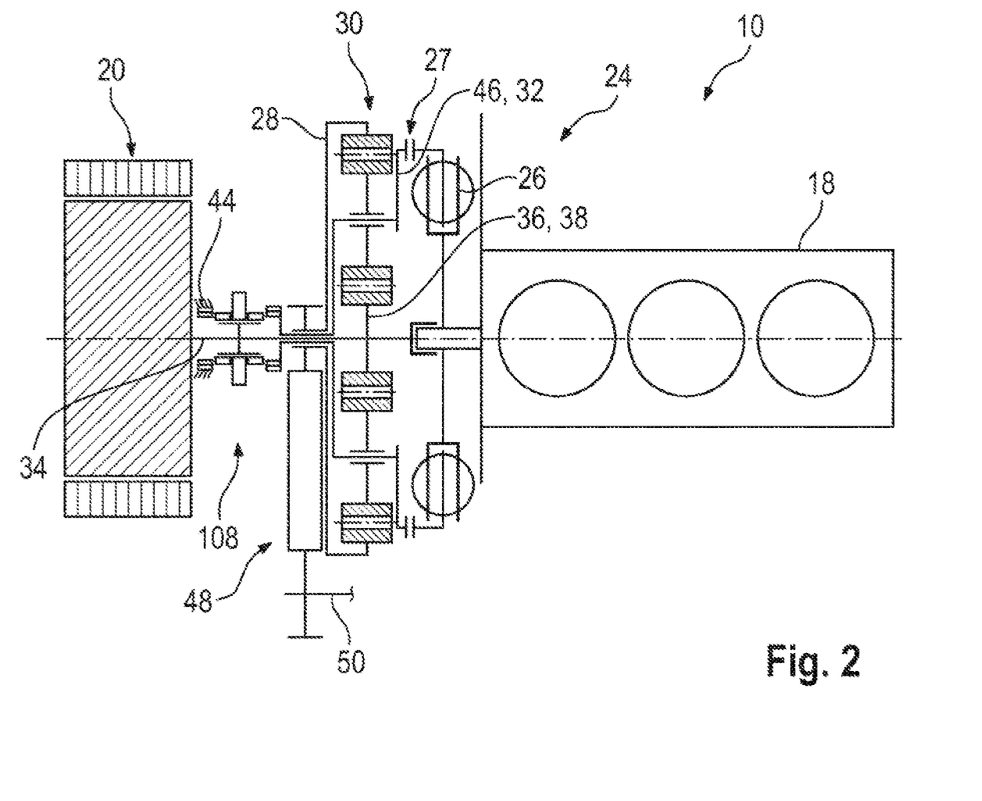
FIG. 2 shows a detail of a drive unit according to the invention with a transmission assembly according to the invention according to a second embodiment.

FIG. 2 shows a second embodiment of the drive unit 10. In this case, only the differences in relation to the first embodiment will be discussed below. Components that are identical or correspond to one another are denoted by the same reference designations. Sections of the drive unit 10 that are not illustrated in FIG. 2 do not differ from the first embodiment.

In the second embodiment, the internal combustion engine 18 is coupled to the planet carrier 46 by way of the torsional vibration damper 26.

The planet carrier 46 thus constitutes the first transmission input shaft 32 of the transmission assembly 24.

The ring gear 28 then serves as output shaft of the first planetary transmission 30 and is correspondingly coupled to the wraparound transmission 48 which acts on the input shaft 50 of the first spur gear transmission 52.

The first electric drive machine 20 is furthermore connected to the sun gear 36 in a torque-transmitting manner. Said sun gear thus also furthermore constitutes the second transmission input shaft 38.

In contrast to the first embodiment, the two shift elements 40, 42 have also been replaced by a double shift element 108.

In this case, the double shift element 108 is arranged on a side of the first electric drive machine 20 facing toward the internal combustion engine 18.

As before, the shift element 108 can be used to selectively couple the second transmission input shaft 38 to the transmission housing 44.

Alternatively, the shift element 108 may be used to selectively couple the second transmission input shaft 38 to the planet carrier 46 in a torque-transmitting manner.

Figure 3:
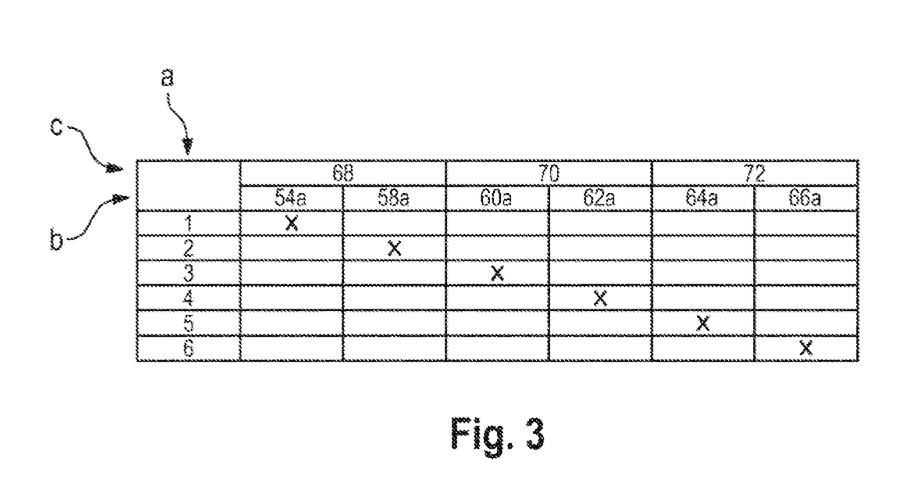
FIG. 3 shows an engagement sequence diagram according to which the transmission assemblies according to the invention according to the first and the second embodiment can be operated.

The drive units 10 according to the first and the second embodiment, in particular the associated transmission assemblies 24, may be operated in different gears. FIG. 3 shows an associated engagement sequence diagram.

In this case, corresponding gear numbers are indicated in column a. The idler gearwheels present within the first spur gear transmission 52 are listed in row b. The respectively assigned shift elements are noted in row c.

The transmission assembly 24 can thus be used to provide different torque/rotational speed combinations at the transmission output shaft 82.

In this context, a first gear can be shifted with the shift element 68 by connecting the idler gearwheel 54a belonging to the spur gear stage 54 to the input shaft 50 of the first spur gear transmission 52 in a rotationally fixed manner.

A second gear is shifted by coupling the idler gearwheel 58a to the input shaft 50 with the shift element 68.

A third gear can also be shifted with the shift element 70 by coupling the idler gearwheel 60a to the input shaft 50.

A fourth gear can also be shifted with the shift element 70 by coupling the idler gearwheel 62a to the input shaft 50.

A fifth gear and a sixth gear can be shifted with the shift element 72.

In the fifth gear, the idler gearwheel 64a is coupled to the input shaft 50 in a rotationally fixed manner with the shift element 72, and in the sixth gear it is the idler gearwheel 66a.

There are thus six shiftable gears.

In this case, non-shifted idler gearwheels in all gears are rotatable relative to the input shaft 50.

The shift elements 40, 42 and 96 may be shifted independently thereof.

As already explained, the first planetary transmission 30 can be blocked by the shift element 40. In this state, the drive unit 10 can be driven purely by way of the first electric drive machine 20.

The shift element 42 can be used to fix the second transmission input shaft 38 in the transmission housing 44. The first planetary transmission 30 then functions as a stationary transmission. The first electric drive machine 20 is then also decoupled from the first planetary transmission 30.

The drive unit 10 is then driven exclusively by way of the internal combustion engine 18.

If both the shift element 40 and the shift element 42 are open, the first planetary transmission 30 functions as a superposition transmission. This can be operated with a transmission ratio that can be set in a continuously variable manner, the first electric drive machine 20 serving as adjusting element. The first planetary transmission 30 thus becomes what is known as an eCVT (electric continuously variable transmission). It is additionally possible to implement additional transmission ratio stages by way of the various spur gear stages 54, 58, 60, 62, 64, 66 of the spur gear transmission 52.

The shift element 96 relates to the coupling of the second electric drive machine 22 to the transmission assembly 24.

This may take place selectively by way of one of the two spur gear stages 90, 92, to which different transmission ratios are assigned. In other words, two gears are thus also provided with the second spur gear transmission 88.

In this context, if the idler gearwheel 90a is connected to the input shaft 84 in a rotationally fixed manner, a first gear is shifted. If the idler gearwheel 92a is coupled to the input shaft 84 in a rotationally fixed manner, a second gear is shifted.

In this context, the second electric drive machine 22 may function as a drive motor and provide a torque via the second spur gear transmission 88 and the wraparound transmission 98, said torque serving to drive the wheels 14a, 14b.

This may take place, for example, in what is known as a boost operation, that is to say for the short-term provision of a high drive power to the wheels 14a, 14b.

However, the second electric drive machine 22 may also function as a generator. It can thus recuperate power imparted by the wheels 14a, 14b and feed it into a battery (not illustrated any more detail). Torque is then introduced from the transmission assembly 24 into the second electric drive machine.

Figure 4:
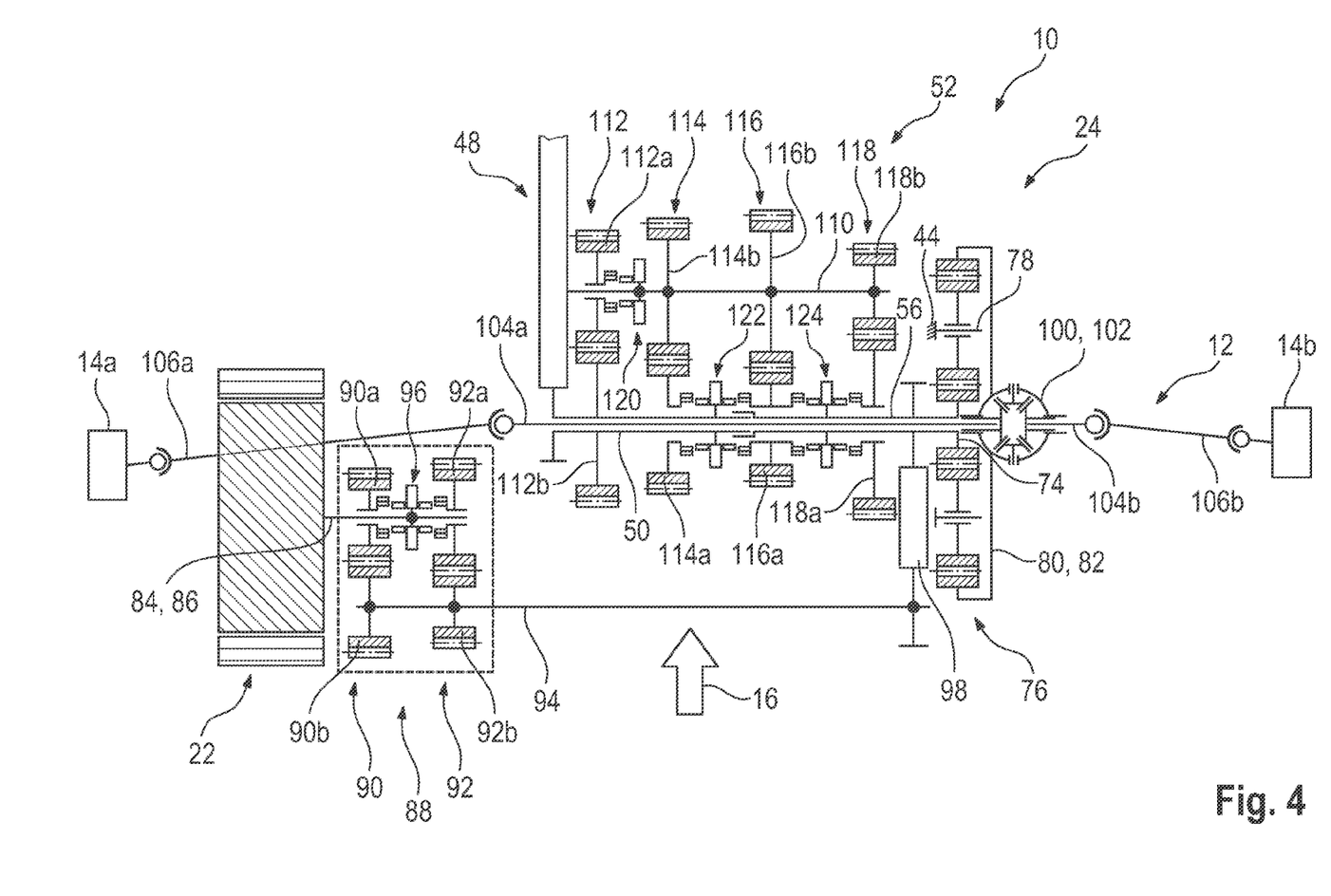
FIG. 4 shows a detail of a drive unit according to the invention with a transmission assembly according to the invention according to a third embodiment.

A third embodiment of the drive unit 10 can be seen in FIG. 4. Once again, only the differences with respect to the already explained embodiments will be discussed in this case. Components that are identical or correspond to one another therefore bear the same reference designations. Sections of the drive unit 10 that are not illustrated in FIG. 4 do not differ from the first embodiment.

The drive unit 10 according to the third embodiment differs from the first two embodiments in particular with regard to the construction of the first spur gear transmission 52. A compactness approach has been used in this case.

The input shaft 50 of the first spur gear transmission 52 and the output shaft 56 of the first spur gear transmission 52 run in a substantially concentric manner.

In addition, the first spur gear transmission 52 now comprises a countershaft 110 via which the input shaft 50 and the output shaft 56 are couplable.

In this case, acting between the input shaft and the countershaft 110 is a first spur gear stage 112, which comprises an idler gearwheel 112a which is rotatably mounted on the countershaft 110, and a fixed gearwheel 112b which is seated on the input shaft 50 in a rotationally fixed manner.

A second spur gear stage 114 also acts between the countershaft 110 and the input shaft 50. In this case, an idler gearwheel 114a is rotatably mounted on the input shaft 50, and a fixed gearwheel 114b is seated on the countershaft 110 in a rotationally fixed manner.

Two spur gear stages also act between the output shaft 56 and the countershaft 110.

A third spur gear stage 116 has an idler gearwheel 116a which is rotatably arranged on the output shaft 56, and a fixed gearwheel 116b which is arranged on the countershaft 110 in a rotationally fixed manner.

A fourth spur gear stage 118 likewise comprises an idler gearwheel 118a which is rotatably positioned on the output shaft 56, and a fixed gearwheel 118b which is arranged on the countershaft 110 in a rotationally fixed manner.

In addition, in the third embodiment, the first spur gear transmission 52 comprises a total of three shift elements.

In this case, a first shift element 120 is embodied as a single-acting shift element and is used to selectively couple the idler gearwheel 112a to the countershaft 110 in a rotationally fixed manner.

A second shift element 122 is embodied as a double shift element and can selectively couple the idler gearwheel 114a or the idler gearwheel 116a to the input shaft 50 in a rotationally fixed manner.

The third shift element 124 is also embodied as a double shift element. It can selectively couple either the idler gearwheel 116a or the idler gearwheel 118a to the output shaft 56 in a rotationally fixed manner.

As before, the output shaft 56 of the first spur gear transmission 52 is fixedly coupled to the sun gear 74 of the second planetary transmission 76.

In addition, in the drive unit 10 according to the third embodiment, the connection position of the wraparound transmission 98 is changed. Although the latter still acts on the output shaft 56, it now does so between the second planetary transmission 76 and the fourth spur gear stage 118.

Figure 5:
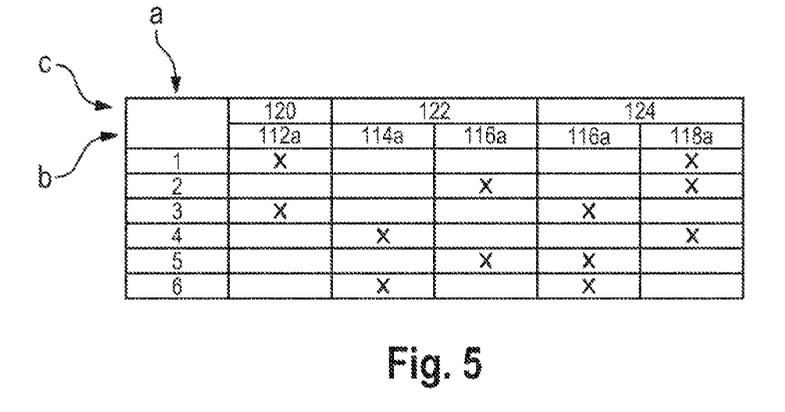
FIG. 5 shows an engagement sequence diagram according to which the transmission assembly according to the invention according to the third embodiment can be operated.

It is likewise possible to shift six gears with the drive unit 10 according to the third embodiment, in particular with the assigned transmission assembly 24. FIG. 5 shows an associated engagement sequence diagram.

In this case, corresponding gear numbers are indicated in column a. The idler gearwheels present within the first spur gear transmission 52 are listed in row b. The respectively assigned shift elements are noted in row c.

In a first gear, the shift element 120 is activated, with the result that the idler gearwheel 112a is connected to the countershaft 110 in a rotationally fixed manner.

The idler gearwheel 118a is also coupled to the output shaft 56 in a rotationally fixed manner with the shift element 124.

In a second gear, the idler gearwheel 116a is coupled to the input shaft 50 in a rotationally fixed manner with the shift element 122, and the idler gearwheel 118a is coupled to the output shaft 56 in a rotationally fixed manner with the shift element 124.

In a third gear, the idler gearwheel 112a is again coupled to the countershaft 110 in a rotationally fixed manner with the shift element 120. In addition, the idler gearwheel 116a is coupled to the output shaft 56 in a rotationally fixed manner with the shift element 124.

In a fourth gear, the idler gearwheel 114a is coupled to the input shaft 50 in a rotationally fixed manner with the shift element 122, and the idler gearwheel 118a is coupled to the output shaft 56 in a rotationally fixed manner with the shift element 124.

In a fifth gear, the idler gearwheel 116a is coupled to the input shaft 50 in a rotationally fixed manner with the shift element 122.

In addition, the idler gearwheel 116a is coupled to the output shaft 56 in a rotationally fixed manner with the shift element 124.

The input shaft 50 and the output shaft 56 are thus connected in a rotationally fixed manner with the idler gearwheel 116a.

In a sixth gear, the idler gearwheel 114a is coupled to the input shaft 50 in a rotationally fixed manner with the shift element 122, and the idler gearwheel 116a is coupled to the output shaft 56 in a rotationally fixed manner with the shift element 124.

Figure 6:
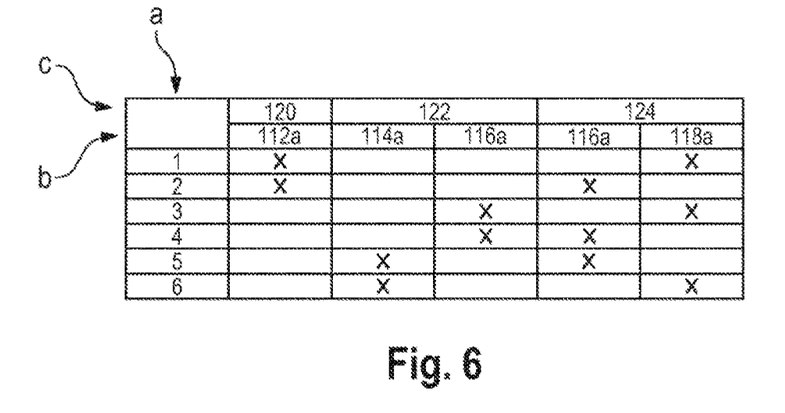
FIG. 6 shows an alternative engagement sequence diagram according to which the transmission assembly according to the invention according to the third embodiment can be operated.

It is also possible during operation of the drive unit 10 according to the third embodiment for six gears to be implemented with an alternative engagement sequence diagram, which is illustrated in FIG. 6. In this case, corresponding gear numbers are again indicated in column a. The idler gearwheels present within the first spur gear transmission 52 are listed in row b. The respectively assigned shift elements are noted in row c.

In this case, in a first gear, the shift element 120 is activated, with the result that the idler gearwheel 112a is connected to the countershaft 110 in a rotationally fixed manner.

The idler gearwheel 118a is also coupled to the output shaft 56 in a rotationally fixed manner with the shift element 124.

In a second gear, the shift element 120 is also activated again, with the result that the idler gearwheel 112a is connected to the countershaft 110 in a rotationally fixed manner.

In addition, the idler gearwheel 116a is connected to the output shaft 56 in a rotationally fixed manner with the shift element 124.

In a third gear, the idler gearwheel 116a is connected to the input shaft 50 in a rotationally fixed manner with the shift element 122. In addition, the idler gearwheel 118a is coupled to the output shaft 56 in a rotationally fixed manner with the shift element 124.

In a fourth gear, the idler gearwheel 116a is coupled to the input shaft 50 in a rotationally fixed manner with the shift element 122.

In addition, the idler gearwheel 116a is coupled to the output shaft 56 in a rotationally fixed manner with the shift element 124.

The input shaft 50 and the output shaft 56 are thus connected in a rotationally fixed manner with the idler gearwheel 116a.

In a fifth gear, the idler gearwheel 114a is coupled to the input shaft 50 in a rotationally fixed manner with the shift element 122, and the idler gearwheel 116a is coupled to the output shaft 56 in a rotationally fixed manner with the shift element 124.

In a sixth gear, the idler gearwheel 114a is coupled to the input shaft 50 in a rotationally fixed manner with the shift element 122, and the idler gearwheel 118a is coupled to the output shaft 56 in a rotationally fixed manner with the shift element 124.

The couplings and gears that are shiftable with the shift elements 40, 42 and 96 are produced as already explained with regard to the first and the second embodiment.

All of the aforementioned embodiments may also be varied with regard to the connection of the second electric drive machine 22.

In this context, in all the embodiments mentioned, it is alternatively possible for the second electric drive machine 22 to be coupled to a second vehicle axle which is separate from the first vehicle axle 12.

The second vehicle axle is preferably a rear axle.

If the second electric drive machine 22 functions as an electric motor, a torque that serves for driving of associated wheels is introduced into the second vehicle axle.

In this case, the torque may be introduced into the second vehicle axle via the second spur gear transmission 88 and/or the wraparound transmission 98.

It is also possible for the second electric drive machine 22 to function as a generator and to consequently recuperate power imparted by the wheels of the second vehicle axle and feed it into a battery. This can also be effected via the second spur gear transmission 88 and/or the wraparound transmission 98.

The invention claimed is:

1. A transmission assembly for a hybrid vehicle, the transmission assembly comprising:
    a first transmission input shaft of the transmission assembly, said first transmission input shaft being couplable to an internal combustion engine;
    a second transmission input shaft of the transmission assembly, said second transmission input shaft being couplable to a first electric drive machine;
    a first planetary transmission;
    a second planetary transmission;
    a first spur gear transmission; and
    a transmission output shaft of the transmission assembly, wherein
    the first transmission input shaft and the second transmission input shaft are coupled to the first planetary transmission in a torque-transmitting manner, wherein
    the transmission output shaft is coupled to the second planetary transmission in a torque-transmitting manner, wherein
    the first spur gear transmission is arranged mechanically between the first planetary transmission and the second planetary transmission, wherein
    a third transmission input shaft is provided which is couplable to a second electric drive machine, and wherein
    the third transmission input shaft is coupled to the second planetary transmission in a torque-transmitting manner via a wraparound transmission in order to introduce torque into the second planetary transmission, and wherein
    the third transmission input shaft is additionally coupled to the second planetary transmission in a torque-transmitting manner via a second spur gear transmission.

2. The transmission assembly according to claim 1, wherein
    the first transmission input shaft is coupled to a ring gear or to a planet carrier of the first planetary transmission in a torque-transmitting manner, and wherein
    the first transmission input shaft is connected to the ring gear or to the planet carrier of the first planetary transmission in a rotationally fixed manner.

3. The transmission assembly according to claim 1, wherein the second transmission input shaft is coupled to a sun gear of the first planetary transmission in a torque-transmitting manner, and wherein the second transmission input shaft is connected to the sun gear of the first planetary transmission in a rotationally fixed manner.

4. The transmission assembly according to claim 1, wherein the second transmission input shaft is selectively couplable to a ring gear of the first planetary transmission in a rotationally fixed manner with a first shift element, and/or in that the second transmission input shaft is selectively couplable to a transmission housing in a rotationally fixed manner with a second shift element.

5. The transmission assembly according to claim 1, wherein the first planetary transmission is connected to the first spur gear transmission in a torque-transmitting manner via a wraparound transmission for introducing torque into the first spur gear transmission.

6. The transmission assembly according to claim 5, wherein a planet carrier and/or a ring gear of the first planetary transmission is coupled to an input shaft of the first spur gear transmission in a torque-transmitting manner via the wraparound transmission.

7. The transmission assembly according to claim 1, wherein the first spur gear transmission has at least two shiftable spur gear stages.

8. The transmission assembly according to claim 1, wherein an output shaft of the first spur gear transmission is coupled to a sun gear of the second planetary transmission in a torque-transmitting manner, and wherein the output shaft of the first spur gear transmission is coupled to the sun gear of the second planetary transmission in a rotationally fixed manner.

9. The transmission assembly according to claim 1, wherein an input shaft of the first spur gear transmission and an output shaft of the first spur gear transmission are substantially parallel.

10. The transmission assembly according to claim 1, wherein an input shaft of the first spur gear transmission and an output shaft of the first spur gear transmission are arranged in a substantially concentric manner, and wherein the first spur gear transmission comprises a countershaft via which the input shaft and the output shaft are selectively couplable in a torque-transmitting manner.

11. A drive unit for driving a first vehicle axle, the drive unit comprising:

a transmission assembly according to claim 1;

an internal combustion engine which is coupled to the first transmission input shaft in a torque-transmitting manner; and a first electric drive machine which is coupled to the second transmission input shaft in a torque-transmitting manner.

12. The drive unit according to claim 11, wherein the transmission output shaft is arranged coaxially with respect to the first vehicle axle or at least in a region of the first vehicle axle and parallel to the first vehicle axle, and wherein an output shaft of the first spur gear transmission is also arranged coaxially with respect to the first vehicle axle or at least in the region of the first vehicle axle and parallel to the first vehicle axle.

13. The drive unit according to claim 11, wherein a second electric drive machine for driving the first vehicle axle is coupled to a third transmission input shaft in a torque-transmitting manner, or the second electric drive machine is coupled to a second vehicle axle for driving the second vehicle axle.

* * * * *